United States Patent

Chang et al.

[11] Patent Number: 5,906,805
[45] Date of Patent: May 25, 1999

[54] STABILIZED HYDROXYLAMINE SOLUTIONS

[75] Inventors: Chin Hsiung Chang, Palatine; Alan E. Van Til, Itasca, both of Ill.; Zhenrong Qian, Randolph, N.J.

[73] Assignee: AlliedSignal Inc., Morristown, N.J.

[21] Appl. No.: 08/848,369

[22] Filed: Apr. 30, 1997

[51] Int. Cl.⁶ .................................................. C01B 21/20
[52] U.S. Cl. ............................................ 423/265; 423/387
[58] Field of Search ....................................... 423/387, 265

[56] References Cited

U.S. PATENT DOCUMENTS

| | | | |
|---|---|---|---|
| 3,145,082 | 8/1964 | Rausch et al. | 23/190 |
| 3,480,391 | 11/1969 | Carlos | 23/190 |
| 3,480,392 | 11/1969 | Carlos | 23/190 |
| 3,544,270 | 12/1970 | Carlos | 23/190 |
| 3,647,449 | 3/1972 | Malloy | 96/50 |
| 3,994,730 | 11/1976 | Frank et al. . | |
| 4,551,318 | 11/1985 | Grosskinsky et al. | 423/265 |
| 4,576,804 | 3/1986 | Grosskinsky et al. | 423/265 |
| 4,629,613 | 12/1986 | Grosskiisky et al. | 423/265 |
| 4,634,584 | 1/1987 | Grosskinsky et al. | 423/265 |
| 5,141,730 | 8/1992 | Heitner | 423/387 |
| 5,338,522 | 8/1994 | Heitner | 423/265 |
| 5,783,161 | 7/1998 | Schneider et al. | 423/387 |

FOREIGN PATENT DOCUMENTS

| | | |
|---|---|---|
| 804844 | 9/1973 | Belgium . |
| 0 147 742 | 7/1985 | European Pat. Off. . |
| 48 0780 99 | 10/1973 | Japan . |
| 57 1009 08 | 6/1982 | Japan . |
| 58 0698 41 | 4/1983 | Japan . |
| 58 0698 42 | 4/1983 | Japan . |
| 58 0698 43 | 4/1983 | Japan . |
| 58 0698 44 | 4/1983 | Japan . |
| 60 2605 41 | 12/1985 | Japan . |
| 195 47 759 | 6/1997 | United Kingdom . |

OTHER PUBLICATIONS 480 780 99 (English Abstract).
571 009 08 (English Abstract).
580 698 41 (English Abstract).
580 698 42 (English Abstract).
580 698 43 (English Abstract).
580 698 44 (English Abstract).
602 605 41 (English Abstract).

*Primary Examiner*—Wayne Langel
*Attorney, Agent, or Firm*—Colleen D. Szuch; Marie Collazo

[57] ABSTRACT

The invention provides stabilized hydroxylamine solutions. In particular, stabilized hydroxylamine solutions and processes for their preparation are provided in which the stabilizing compound is cyclohexanediaminetetraacetic acid, hydrochloride salts of thiamine, or mixtures thereof.

19 Claims, No Drawings ured States Patent 5,906,805

STABILIZED HYDROXYLAMINE SOLUTIONS

FIELD OF THE INVENTION

The present invention relates to stabilized hydroxylamine solutions. In particular, stabilized hydroxylamine solutions and processes for their preparation are provided in which the stabilizing compound is cyclohexanediaminetetraacetic acid, the hydrochloride salt of thiamine, or mixtures thereof.

BACKGROUND OF THE INVENTION

Hydroxylamine solutions are used for a variety of purposes. For example, such solutions may be used in syntheses, in propellant preparation, in photographic processing, and in solvents. It is well known that the use of such solutions is problematic because the solutions are inherently unstable.

A number of stabilizing compounds have been used in attempting to stabilize hydroxylamine solutions, including di- and tetrasodium salts of ethylenediaminetetraacetic acid as disclosed in U.S. Pat. Nos. 3,647,449 and 3,145,082, respectively. However, as further disclosed in U.S. Pat. No. 3,647,449, the disodium ethylenediaminetetraacetic acid salt is unacceptable as a stabilizing agent because it results in a substantial increase in gas evolution due to decomposition of hydroxylamine free base. See Col. 3, lines 10–22; col. 4, lines 19–22. The tetrasodium ethylenediaminetetraacetic acid salt also has proven to be an unsatisfactory stabilizing agent. See U.S. Pat. No. 4,551,318, Col. 1, lines 17–20. Therefore, a need exists for an effective hydroxylamine stabilizing agent.

DESCRIPTION OF THE INVENTION AND ITS PREFERRED EMBODIMENTS

It is a discovery of this invention that aqueous solutions of hydroxylamine may be effectively stabilized by using cyclohexanediaminetetraacetic acid ("CDTA") as a stabilizing compound. This discovery is unexpected because it is known in the art that compounds such as di- and tetrasodium salts of ethylenediaminetetraacetic acid do not make effective hydroxylamine stabilizers. It is yet another discovery of the invention that the hydrochloride salt of thiamine, alone or in combination with CDTA, is a good hydroxylamine stabilizing compound. Therefore, the invention provides aqueous hydroxylamine solutions, and processes for their preparation, which solutions exhibit a longer storage life as well as stability in the face of severe transition metal ion challenges.

More specifically, the invention provides a hydroxylamine solution comprising an aqueous solution of hydroxylamine and a stabilizing amount of a compound selected from the group consisting of CDTA, hydrochloride salt of thiamine, and mixtures thereof Additionally, the invention provides a process for stabilizing a hydroxylamine solution comprising the step of adding a stabilizing amount of a compound selected from the group consisting of CDTA, hydrochloride salt of thiamine, and mixtures thereof to an aqueous solution of hydroxylamine.

By "aqueous solution of hydroxylamine" is meant aqueous solutions of hydroxylamine free base and/or hydroxylamine salts in water or an alcohol, such as a $C_1$ to $C_4$ alkanol. It is known that aqueous solutions of hydroxylamine decompose slowly at room temperature, but more rapidly as the temperature increases. Additionally, decomposition is more pronounced in the case in which the solution is a solution of hydroxylamine free base. It is theorized that the hydroxylamine decomposition is due to an internal oxidation-reduction reaction that is accelerated by elevated temperatures, acids, bases, and transition metal ions.

Aqueous solutions of hydroxylamine useful in the invention may be prepared by any convenient method. For example a base, such as ammonium hydroxide or an alkalimetal hydroxide, may be added to an aqueous solution of a hydroxylamine salt to form the aqueous solution with hydroxylamine free base and its salt. Suitable useful hydroxylamine salts are those formed from hydroxylamine and a strong mineral acid, including without limitation sulfuric, nitric, or hydrochloric acids, or fatty acids, including without limitation acetic and propionic acids. Generally, the amount of hydroxylamine free base or salt in the solution is about 10 to about 70, preferably about 25 to about 50, weight percent of hydroxylamine free base present in the aqueous solution.

Optionally, and preferably, the aqueous hydroxylamine solution is purged with any suitable inert gas, such as nitrogen, in order to minimize the oxygen in the solution. Purging may be performed at an inert gas flow rate of about 50 mL/min for about one hour.

The stabilized hydroxylamine solutions of this invention may be prepared by adding a stabilizing amount of CDTA, hydrochloride salt of thiamine, or a mixture thereof to the aqueous hydroxylamine solution. The CDTA, hydrochloride salt of thiamine, or mixture thereof may be added directly or, preferably, as a concentrated solution of up to about 10 weight percent.

The CDTA isomer preferably used in the invention is trans-1,2-cyclohexanediamine-N,N,N',N'-tetraacetic acid. CDTA, including the preferred isomer, is commercially available. The hydrochloride salt of thiamine too is commercially available. Mixtures of CDTA and the thiamine salt may be used to stabilize aqueous hydroxylamine solutions. However, CDTA alone preferably is used.

A stabilizing amount of CDTA, hydrochloride salt of thiamine, or mixtures thereof is an amount sufficient to deactivate either or both the oxygen and metal ions in the hydroxylamine solution. Generally, this amount is about 1 to about 1000 ppm, preferably from about 1 to about 200 ppm, more preferably from about 50 to about 150 ppm by weight of the stabilized aqueous hydroxylamine solution. One ordinarily skilled in the art will recognize that the exact amount used will depend on a number of factors including the concentration of hydroxylamine free base and/or salt in solution, the storage or reaction temperature, and the transition metal ion impurity level. For example, an aqueous solution of hydroxylamine containing 50 weight percent hydroxylamine free base will exhibit enhanced stability at less than 40° C. and an iron concentration of 0 to 15 ppm when about 50 to 200 ppm CDTA is added.

The invention will be clarified further by a consideration of the following, non-limiting examples.

EXAMPLES

Example 1

A 4-necked, round-bottomed 150 mL flask was used for monitoring gas evolution with unstabilized and stabilized solutions of hydroxylamine free base. One of the four necks was attached to a 25 mL buret and a thermocouple introduced into the hydroxylamine solution through another neck. The other two necks were used for introduction of nitrogen purge gas and the monitoring of evolved gas. The gas outlet was connected to an inverted graduated cylinder filled with water for the collection of the evolved gas. Into the apparatus was charged 90–120 g of stabilized and unstabilized solutions of hydroxylamine free base with known hydroxylamine concentrations. With constant stirring by a magnetic stirring bar, nitrogen gas was introduced at a flow rate of about 500 mL/min for periods of up to 20 minutes. The apparatus was thermostated at temperatures between 5 to 50° C.

The gas evolution was monitored as a function of time by measuring the amount of water displaced from the graduated cylinder. A typical test ended after 24 hours. A linear correlation between the total gas evolved and the time of testing was generally obtained for the stabilized hydroxylamine solution. For comparison, an average gas evolution rate was calculated by dividing the total gas measured at the end of 24 hours with the initial weight of the hydroxylamine solution and time giving:

Average gas rate=total evolved gas (µL)/g hydroxylamine solution per hour

Following this general procedure, a 120 g sample of hydroxylamine solution containing 53 wt percent hydroxylamine free base, 54 ppm trans-1,2-cyclohexanediamine-N,N,N',N'-tetraacetic acid, and 6.04 ppm $Fe^{III}$ was tested at 40° C. in the gas evolution apparatus. From the results of the measurement, an average gas evolution rate of 17.5 µL/g/h was obtained as shown in Table 1 below. This evolution rate indicates that the stabilized solution is very stable, even with 6.04 ppm iron in the solution, given that a comparable unstabilized solution, even without iron, will have an evolution rate of approximately 188 µL/g/h.

Examples 2 through 5

Using the procedure of Example 1, hydroxylamine solutions of 53 wt percent hydroxylamine free base, 53 ppm trans-1,2-cyclohexanediamine-N,N,N',N'-tetraacetic acid, and $Fe^{III}$ ion concentrations of 0, 3.02, 9.13, and 12.08, respectively, were tested. The results are summarized on Table 1.

TABLE 1

| Example | $Fe^{III}$ (ppm) | Gas evolution (µL/g/h) |
| --- | --- | --- |
| 1 | 6.04 | 17.5 |
| 2 | 0.0 | 2.8 |
| 3 | 3.02 | 8.5 |
| 4 | 9.13 | 26.1 |
| 5 | 12.08 | 54.1 |

The results show that 53 ppm of the CDTA produces a very stabilized hydroxylamine free base at 40° C. up to a challenge of 12.08 ppm $Fe^{III}$.

Examples 6–9

Using the procedure of Example 1, FH-50, a stabilized hydroxylamine free base solution available from Nisshin Chemical Co., was tested with $Fe^{III}$ ion concentrations of 3.19, 6,15, 9.12, and 11.96, respectively, at 40° C. Results of these tests, summarized on Table 2, compared with the results of Examples 1–5 show that stabilized solutions of 53 wt percent of hydroxylamine free base and 54 ppm trans-1,2-cyclohexanediamine-N,N,N',N'-tetraacetic acid were more stable than the commercial, stabilized solution.

TABLE 2

| Example | $Fe^{III}$ Concentration (ppm) | Gas Evolution (µL/g/h) |
| --- | --- | --- |
| 6 | 3.19 | 20.5 |
| 7 | 6.15 | 24.5 |
| 8 | 9.12 | 153.0 |
| 9 | 11.96 | 13,764 |

Examples 10–22

Following the procedure of Example 1, stabilized hydroxylamine free base solution, 53 wt percent hydroxylamine free base and containing various amounts of trans-1,2-cyclohexanediamine-N,N,N',N'-tetraacetic acid and $Fe^{III}$ were tested at 40° C. The results are summarized on Table 3.

TABLE 3

| Example | CDTA Concentration (ppm) | $Fe^{III}$ Concentration (ppm) | Gas Evolution (µL/g/h) |
| --- | --- | --- | --- |
| 10 | 77 | 0 | 3.1 |
| 11 | 77 | 2.86 | 9.0 |
| 12 | 77 | 6.11 | 14.4 |
| 13 | 77 | 9.01 | 19.6 |
| 14 | 77 | 11.98 | 33.0 |
| 15 | 101 | 2.98 | 9.8 |
| 16 | 101 | 6.08 | 12.2 |
| 17 | 101 | 8.96 | 24.3 |
| 18 | 101 | 12.08 | 40.1 |
| 19 | 101 | 14.99 | 52.6 |
| 20 | 199 | 6.30 | 27.0 |
| 21 | 199 | 12.19 | 58.0 |
| 22 | 199 | 14.99 | 75.0 |

The results shown on Table 3 demonstrate that excellent stability at 40° C. was obtained using the CDTA for a 53 wt percent hydroxylamine free base solution even with a $Fe^{III}$ challenge of 15 ppm.

Example 23

The heat evolved accompanying the decomposition of hydroxylamine in solution was measured by an isothermal microcalorimeter manufactured by Calorimetry Science Corp. of Pleasant Grove, Utah. Microcalorimetry is an ultra-sensitive heat measurement technique with a sensitivity of approximately ±0.5 microjoule/sec corresponding to the evaporation of one drop of water in 8 years.

The isothermal microcalorimeter consists of thermostated air and water baths, an aluminum block with four cells, one reference and three measurement cells, and an associated electronic system. The operating range of the water bath and, consequently, the instrument is 5 to 75° C. When heat flows across a Peltier-effect junction between the individual cells and the constant-temperature heat sink, a voltage is produced at the terminal of the Peltier device. The voltage is proportional to the heat flow that is related to the heat evolved accompanying the decomposition of the hydroxylamine solution.

The hydroxylamine sample was contained in a 10-mL vial sealed with polytetrafluoroethylene-lined, crimped-top closures. Approximately 5 g stabilized or unstabilized hydroxylamine solution were added to the tared sample container and the weight determined to 1 mg. The sample vial was then placed in a $N_2$-filled dry bag and the sample purged with $N_2$ for up to 30 min before the vial was closed in the dry bag. The sample weight was then re-measured.

Before loading the sample vial into the calorimeter cell, the vial was pre-equilibrated to test temperature for at least two hours in the microcalorimeter air bath. During this time, the heat rate from the empty calorimeter cell was recorded. The vial was then transferred to the cell and the heat rate recorded versus time. The heat rate from the loaded sample was monitored for at least two days to verify the initial decomposition rate was measurable and not rapidly changing. The heat rate was then measured at periodic intervals for at least several hundred hours to determine if there was any time dependence of the decomposition. An average heat rate/g hydroxylamine solution was then calculated as microwatts/g.

A 4.716 g sample of a hydroxylamine solution containing 53 wt percent hydroxylamine free base was tested in the isothermal microcalorimeter following the general procedures described. A heat rate of 920.3 μwatts/g was measured after 17.4 hours and is reported on Table 4.

Examples 24–47

Using the procedure of Example 23, stabilized hydroxylamine solutions containing 53 wt percent hydroxylamine free base and various amounts of trans-1,2-cyclohexanediaminetetraacetic acid and $Fe^{III}$ ion prepared from $Fe(NO_3)_3$ were tested at 40° C. along with FH-50 also containing various amounts of Fe ion. The results of microcalorimetry testing are shown on Table 4.

Examples 48–66

Using the procedure of Example 23, stabilized solutions containing different amounts of hydroxylamine free base and varied amounts of trans-1,2-cyclohexanediaminetetraacetic acid, the hydrochloride salt of thiamine (THIM), 1, 2-phenanthroline (PHEN), the tetrasodium salt of ethylenediaminetetraacetic acid (EDTA), and $Fe^{III}$ ion were tested at 40° and 50° C. The results of the microcalorimeter test are shown on Table 5. The results demonstrate that CDTA is a superior stabilizer compared to EDTA. Also demonstrated is that THIM alone and in combination with CDTA are effective as a stabilizer.

TABLE 5

| Example | Test Temp (°C.) | % HA | CDTA (ppm) | THIM (ppm) | PHEN (ppm) | EDTA (ppm) | $Fe^{III}$ (ppm) | Heat Rate (μwatts/g) |
|---|---|---|---|---|---|---|---|---|
| 48 | 40 | 53.1 | 100.0 | 0 | 0 | 0 | 0 | 5.4 |
| 49 | 40 | 53.0 | 0 | 104.8 | 0 | 0 | 0 | 8.6 |
| 50 | 40 | 53.0 | 0 | 0 | 100.1 | 0 | 0 | 138 |
| 51 | 40 | 53.0 | 0 | 0 | 0 | 101.0 | 0 | 246 |
| 52 | 50 | 21.2 | 100.6 | 0 | 0 | 0 | 8.9 | 245 |
| 53 | 50 | 21.2 | 91.1 | 99.9 | 0 | 0 | 9.1 | 250 |
| 54 | 50 | 21.2 | 105.1 | 0 | 101.8 | 0 | 8.9 | 190 |
| 55 | 50 | 21.2 | 150.0 | 0 | 0 | 0 | 9.1 | 246 |
| 56 | 50 | 21.2 | 150.2 | 101.6 | 0 | 0 | 9.0 | 248 |
| 57 | 50 | 21.2 | 150.1 | 0 | 100.1 | 0 | 8.8 | 240 |
| 58 | 50 | 21.2 | 150.0 | 0 | 0 | 0 | 12.0 | 320 |
| 59 | 50 | 21.2 | 150.2 | 101.6 | 0 | 0 | 12.1 | 326 |
| 60 | 50 | 21.2 | 150.1 | 0 | 100.0 | 0 | 12.1 | 325 |
| 61 | 50 | 21.2 | 150.0 | 0 | 0 | 0 | 15.1 | 400 |
| 62 | 50 | 21.2 | 150.2 | 101.6 | 0 | 0 | 15.3 | 415 |
| 63 | 50 | 21.2 | 150.0 | 0 | 0 | 0 | 15.1 | 391 |
| 64 | 50 | 27.8 | 150.0 | 0 | 0 | 0 | 9.1 | 262 |
| 65 | 50 | 27.8 | 150.0 | 0 | 0 | 0 | 12.2 | 344 |
| 66 | 50 | 27.8 | 150.0 | 0 | 0 | 0 | 15.1 | 423 |

TABLE 4

| Example | Free Base (wt %) | CDTA (ppm) | $Fe^{III}$ Concentration (ppm) | Heat Rate (μwatts/g) |
|---|---|---|---|---|
| 23 | 53 | 0 | 0 | 920.3 |
| 24 | 53 | 54 | 0 | 6.9 |
| 25 | 53 | 54 | 302 | 47.0 |
| 26 | 53 | 54 | 6.04 | 85.5 |
| 27 | 53 | 54 | 9.13 | 161.2 |
| 28 | 53 | 54 | 12.08 | 3760.0 |
| 29 | 53 | 77 | 0 | 6.5 |
| 30 | 53 | 77 | 2.86 | 47.5 |
| 31 | 53 | 77 | 6.11 | 95.5 |
| 32 | 53 | 77 | 9.01 | 130.6 |
| 33 | 53 | 77 | 1.98 | 319.2 |
| 34 | 53 | 101 | 0 | 5.2 |
| 35 | 53 | 101 | 2.98 | 34.7 |
| 36 | 53 | 101 | 6.08 | 108.7 |
| 37 | 53 | 101 | 8.96 | 119.6 |
| 38 | 53 | 101 | 12.08 | 1542.0 |
| 39 | 53 | 1 | 14.99 | 185.0 |
| 40 | 53 | 199 | 0 | 5.5 |
| 41 | 53 | 199 | 6.30 | 73.6 |
| 42 | 53 | 199 | 12.19 | 137.0 |
| 43 | 53 | 199 | 14.00 | 159.9 |
| 44 | FH-50 | — | 0 | 13.0 |
| 45 | FH-50 | — | 3.19 | 68.3 |
| 46 | FH-50 | — | 6.15 | 146.0 |
| 47 | FH-50 | — | 9.12 | 6838.0 |

The results shown on Table 4 demonstrate that the CDTA is an effective stabilizer.

Examples 67–76

Using the procedure of Example 23, stabilized hydroxylamine solutions containing 48.6 wt percent hydroxylamine free base and $Fe^{II}$ and $Fe^{III}$ ions from either sulfate or nitrate were tested at 40° C. The results are shown on Table 6.

TABLE 6

| Example | Test Temp. (°C.) | % HA | CDTA (ppm) | $Fe^{II}$ From Sulfate (ppm) | $Fe^{III}$ From Sulfate (ppm) | $Fe^{III}$ from Nitrate (ppm) | Heat Rate (μwatts/g) |
|---|---|---|---|---|---|---|---|
| 67 | 40 | 48.6 | 105 | 3.62 | 0 | 0 | 92.54 |
| 68 | 40 | 48.6 | 105 | 6.14 | 0 | 0 | 100.30 |
| 69 | 40 | 48.6 | 105 | 9.02 | 0 | 0 | 147.16 |
| 70 | 40 | 48.6 | 123 | 5.96 | 0 | 0 | 86.38 |
| 71 | 40 | 48.6 | 123 | 8.95 | 0 | 0 | 136.08 |
| 72 | 40 | 48.6 | 123 | 11.95 |  | 0 | 161.87 |
| 73 | 40 | 48.6 | 105 | 0 | 3.05 | 0 | 76.97 |
| 74 | 40 | 48.6 | 105 | 0 | 6.03 | 0 | 131.60 |
| 75 | 40 | 48.6 | 105 | 0 | 9.07 | 0 | 147.85 |
| 76 | 40 | 48.6 | 122 | 0 | 0 | 15.02 | 197.97 |

The results shown on Table 6 demonstrate that the CDTA is effective for $Fe^{II}$ and $Fe^{III}$ ions, regardless of whether the ions came from sulfate or nitrate.

Examples 77–83

Using the procedure of Example 23, stabilized hydroxylamine solutions containing 48.6 wt percent hydroxylamine free base and iron rusts, FeO and $Fe_2O_3$, were tested at 40° C. The results are shown on Table 7.

TABLE 7

| Example | CDTA (ppm) | FeO (ppm) | $Fe_2O_3$ (ppm) | Heat Rate ($\mu$watts/g) |
|---|---|---|---|---|
| 77 | 105 | 0 | 0 | 21.1 |
| 78 | 105 | 190 | 0 | 89.3 |
| 79 | 105 | 689 | 0 | 198.9 |
| 80 | 105 | 1135 | 0 | 429.9 |
| 81 | 105 | 0 | 113 | 87.3 |
| 82 | 105 | 0 | 236 | 82.3 |
| 83 | 105 | 0 | 510 | 159.8 |

The results shown on Table 7 demonstrate that the CDTA is effective even in the face of iron rust challenges.

Examples 84–85

Using the procedure of Example 23, stabilized and unstabilized solutions of 30 wt percent hydroxylamine sulfate and 11 ppm Fe ion were tested. Results are Table 8.

TABLE 8

| Example | CDTA Concentration (ppm) | $Fe^{III}$ Concentration (ppm) | Heat Rate ($\mu$watts/g) |
|---|---|---|---|
| 84 | 0 | 11 | 0.792 ± 0.016 |
| 85 | 120 | 11 | 0.298 ± 0.014 |

The results demonstrate that the addition of CDTA significantly decreased the rate of decomposition of the stabilized solution.

What is claimed is:

1. A hydroxylamine solution comprising an aqueous solution of hydroxylamine and a stabilizing amount of a compound selected from the group consisting of a hydrochloride salt of thiamine and a mixture of a hydrochloride salt of thiamine with cyclohexanediaminetetraacetic acid.

2. The solution of claim 1 wherein the compound is a hydrochloride salt of thiamine.

3. The solution of claim 1 wherein the compound is a mixture of cyclohexanediaminetetraacetic acid and a hydrochloride salt of thiamine.

4. The solution of claim 3 wherein the cyclohexanediaminetetraacetic acid is trans-1,2-cyclohexanediamine-N,N,N',N'-tetraacetic acid.

5. The solution of claim 1 wherein the compound is present in an amount of about 1 to about 1000 ppm by weight based on the weight of the hydroxylamine solution.

6. The solution of claim 1 wherein the compound is present in an amount of about 1 to about 200 ppm by weight based on the weight of the hydroxylamine solution.

7. A hydroxylamine solution comprising an aqueous solution of hydroxylamine free base in water and a compound selected from the group consisting of a hydrochloride salt of thiamine and a mixture of a hydrochloride salt of thiamine with cyclohexanediaminetetraacetic acid.

8. The solution of claim 7 wherein the compound is a hydrochloride salt of thiamine.

9. The solution of claim 7 wherein the compound is a mixture of cyclohexanediaminetetraacetic acid and a hydrochloride salt of thiamine.

10. The solution of claim 9 wherein the cyclohexanediaminetetraaetic acid is trans-1,2-cyclohexanediamine-N,N,N',N'-tetraacetic acid.

11. The solution of claim 7 wherein the compound is present in an amount of about 1 to about 200 ppm based on the weight of the hydroxylamine solution.

12. The solution of claim 7 wherein the compound is present in an amount of about 1 to about 1000 ppm by weight based on the weight of the hydroxylamine solution.

13. A process for stabilizing a hydroxylamine solution comprising the step of adding a stabilizing effective amount of a compound selected from the group consisting of a hydrochloride salt of thiamine and a mixture of a hydrochloride salt of thiamine with cyclohexanediaminetetraacetic acid to an aqueous solution of hydroxylamine.

14. The process of claim 13 wherein the compound is present in an amount of about 1 to about 1000 ppm based on the weight of the hydroxylamine solution.

15. The process of claim 13 wherein the aqueous solution of hydroxylamine is an aqueous solution of hydroxylamine free base in water.

16. The process of claim 13 wherein the compound is a hydrochloride salt of thiamine.

17. The process of claim 13 wherein the compound is a mixture of cyclohexanediaminetetraacetic acid and a hydrochloride salt of thiamine.

18. The process of claim 17 wherein the cyclohexanediaminetetraaetic acid is trans-1,2-cyclohexanediamine-N,N,N',N'-tetraacetic acid.

19. The process of claim 13 wherein the compound is present in an amount of about 1 to about 200 ppm based on the weight of the hydroxylamine solution.

* * * * *